United States Patent [19]

Anderson et al.

[11] 4,036,637
[45] July 19, 1977

[54] SEPARATION OF ZIRCONIUM-HAFNIUM BY NITRIDE PRECIPITATION

[75] Inventors: Robert N. Anderson, Palo Alto; Norman A. Parlee, Los Altos Hills, both of Calif.

[73] Assignee: Parlee-Anderson Corporation, Menlo Park, Calif.

[21] Appl. No.: 517,581

[22] Filed: Oct. 24, 1974

[51] Int. Cl.$^2$ .................. C22B 34/00; C01G 23/00; C01G 56/00
[52] U.S. Cl. ................................ 75/84; 423/3; 423/69; 423/73
[58] Field of Search .................. 423/3, 69, 73; 75/84

[56] References Cited

U.S. PATENT DOCUMENTS

| | | | |
|---|---|---|---|
| 1,580,650 | 4/1926 | Coster | 423/73 |
| 2,793,107 | 5/1957 | Jazwinski | 75/84 |
| 3,268,302 | 8/1966 | Renner | 423/73 |
| 3,794,482 | 2/1974 | Anderson et al. | 75/84 |
| 3,857,919 | 12/1974 | Hazen et al. | 423/73 |

Primary Examiner—Leland A. Sebastian
Assistant Examiner—Josephine Lloyd
Attorney, Agent, or Firm—Flehr, Hohbach, Test, Albritton & Herbert

[57] ABSTRACT

A method for the separation of a light reactive metal (e.g., zirconium) from a heavy reactive metal (e.g., hafnium) by forming insoluble nitrides of the metals in a molten metal solvent (e.g., copper) inert to nitrogen and having a suitable density for the light metal nitride to form a separate phase in the upper portion of the solvent and for the heavy metal nitride to form a separate phase in the lower portion of the solvent. Nitriding is performed by maintaining a nitrogen-containing atmosphere over the bath. The light and heavy metals may be an oxide mixture and carbothermically reduced to metal form in the same bath used for nitriding. The nitrides are then separately removed and decomposed to form the desired separate metals.

16 Claims, 1 Drawing Figure

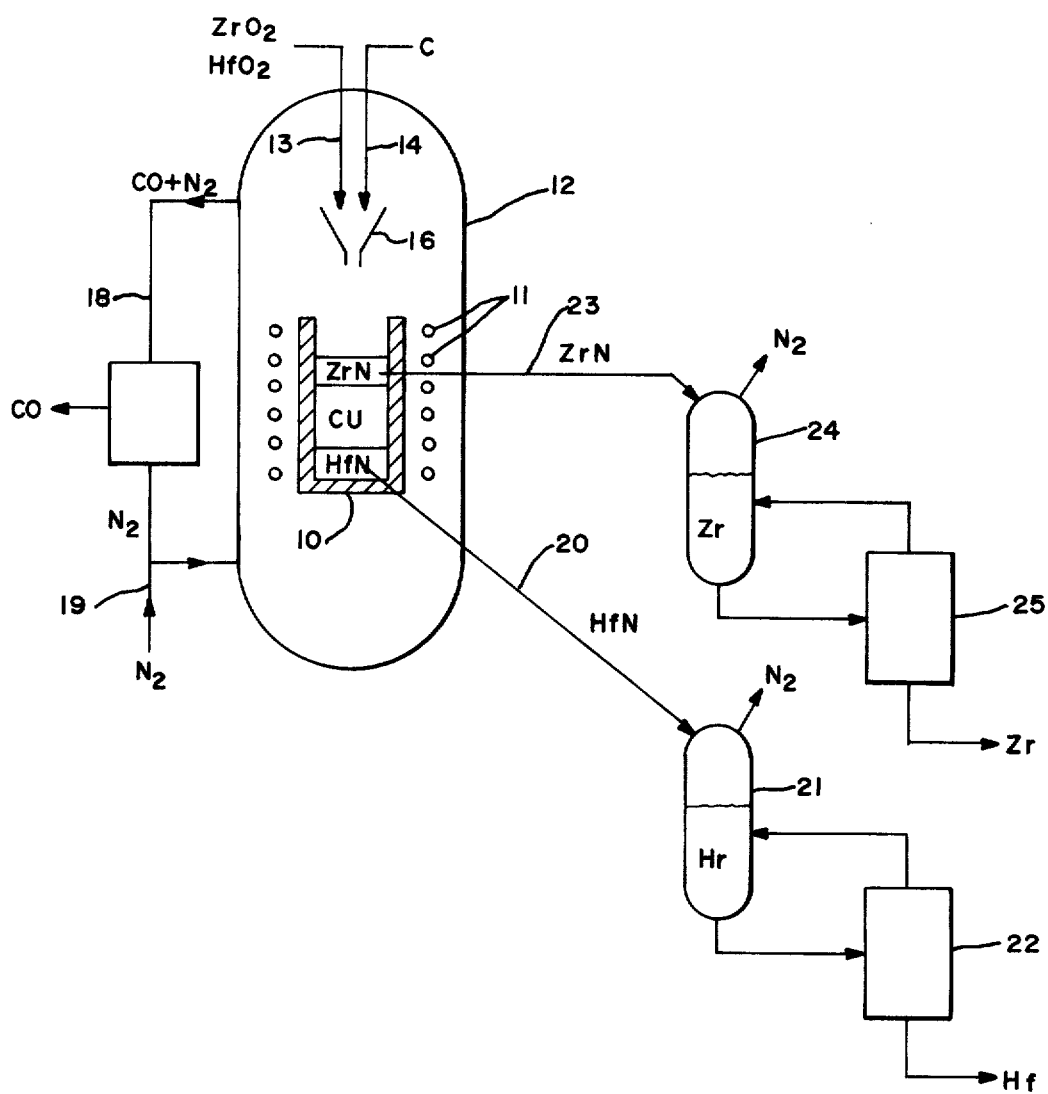

SEPARATION OF ZIRCONIUM-HAFNIUM BY NITRIDE PRECIPITATION

SUMMARY OF THE INVENTION AND OBJECTS

It is an object of the present invention to provide a method for the separation of two or more metals reactive with nitrogen to form nitrides of different densities by a phase separation technique.

It is a particular object of the invention to provide a method of the above type for separating zirconium and hafnium or other mixtures of metals with similar chemical characteristics which render them difficult to separate by chemical means.

It is a further object of the invention to provide an economical method for simultaneously reducing mixtures of metal oxides and performing the foregoing separation.

In accordance with the above objects, a method is disclosed for the separation of a light metal (e.g., zirconium) from a heavy metal (e.g. hafnium), both reactive with nitrogen, from a mixture containing such metals. This mixture is dissolved in a molten metal solvent which does not readily form nitrides and which has a specific gravity between the nitrides of the two metals. The light and heavy metals are converted into nitride products insoluble in the solvent by maintaining a nitrogen-containing atmosphere over the molten metal solvent. After this nitride reaction, the light metal nitride floats in a separate phase above or in the upper portion of the solvent while the heavy metal nitride sinks in a separate phase below or in the lower portion of the solvent. This technique is highly effective for separating relatively light zirconium metal from relatively heavy hafnium metal. These metals are dissolved in molten copper solvent and subjected to a nitrogen atmosphere. The zirconium forms an insoluble nitride which floats in the upper portion of the copper in a separate phase while the hafnium forms a nitride which sinks in a separate phase to the lower portion of the copper.

The above two metal nitride phases may be separated from the molten metal solvent and formed into the corresponding metals by a number of different techniques. For example, either the light or heavy metal nitrides may be removed from contact with the molten solvent and placed in contact with fres solvent metal and decomposed to metal form by lowering the nitrogen partial pressure; while the residual metal nitride remaining in contact with the solvent metal is correspondingly reduced to metal form by lowering the nitrogen partial pressure over the mixture.

The present process is particularly effective for the carbothermic reduction of a mixture of metal oxides in the presence of carbon in a molten solvent and performing the foregoing nitriding separation upon the reduced metals as part of the same overall reaction. Thus, the carbon and nitrogen-contaning atmosphere would be present simultaneously in the reaction vessel.

Further objects and features of the present invention will appear from the following description and accompanying drawing in which the preferred embodiments are set forth in detail.

BRIEF DESCRIPTION OF THE DRAWING

The single FIGURE is a schematic view of apparatus suitable for carrying out the process of the present invention.

DETAILED DESCRIPTION OF THE PREFERRED EMBODIMENTS

I. Separation of Metal Oxides

In one embodiment, an oxide of a light metal is separated from an oxide of the heavy metal, both of which are reactive with nitrogen. As used herein, the terms light and heavy metals refer to relative densities of the nitrides of these metals with respect to each other. Thus, for example, in a mixture of zirconium oxide and hafinum oxide, zirconium is designated as the light metal even though it is relatively heavy (zirconium nitride density — about 7.0 ) while hafnium is designated as the heavy metal (hafnium nitride density — about 2.0).

In accordance with this embodiment, carbon and the light and heavy metal oxides are reacted in contact with a molten metal solent, reduced to metal form in solution and converted into nitride products insoluble in the molten metal solvent. The density of molten metal solvent is selected to be between that of the light and heavy metal nitrides so that the light metal nitride floats in a separate phase above the solvent and the heavy metal nitride sinks in a separate phase below the same.

In the present process, the light and heavy metal nitrides from separate insoluble phases in the upper and lower portions, respectively, of the solvent metal separated by a liquid metal barrier of the solvent metal. The terminology of separate phases in the upper and lower solvent metal portions are intended to encompass metal nitride layers essentially free of solvent metal as well as layers of insoluble nitride particles dispersed in solvent metal in the interstices. In either situation, the presence of the liquid metal solvent barrier permits a clean separation between the floating and sunk metal nitride layers.

The disclosure of our aforementioned U.S. Pat. No. 3,794,482, is incorporated at this point by reference. Briefly summarized, it discloses a technique for carbothermically reducing an oxide of a "reactive" metal defined as a metal which readily reacts with carbon to form a corresponding metal carbide. This reduction is performed in a molten metal solvent which prevents the formation of carbides so that the reduction product is molten metal. The molten metal solvent is specified as one that lowers the activity of the reduced reactive metal formed during the reduction raction to a level below that required for the reactive metal to form a carbide under the reaction conditions prevailing in the system. Such molten metal solvent is capable of forming stable intermetallic compounds with the reactive metal. During this carbothermic reduction, the partial pressure of the carbon monoxide present over the reaction mixture is maintained at a level below the equilibrium value for the reaction mixture as the reduction of the metal oxide takes place.

The above patent also discloses a method for carrying out the carbothermic reduction in the presence of the nitrogen-containing atmosphere. The overall reaction which takes place in the solution is represented by the following generalized formula:

$$MO_2(s) + 2C(s) + \tfrac{1}{2}N_2(g) = MN(s) + 2CO(g) \qquad (1)$$

In the above and other equations employed herein, M represents reactive metal, $(s)$ and $(g)$ repesent solid and gaseous components, respectively.

Reaction (1) is the underlying reaction for the separation technique of the present invention in which the light and heavy metal oxides are converted to corresponding insoluble light and heavy metal nitrides in a molten metal solvent having a density selected to be between that of the two nitride products.

The method of this invention has utility for separating the oxides of a wide variety of light and heavy metal oxides so long as the reactive metals react readily with carbon to form the corresponding metal carbides and the reduced metals react readily with nitrogen to form the corresponding nitrides. This assumes the availability of an appropriate molten metal solvent. Suitable reactive metals which fulfill this criterion include niobium, tantalum, plutonium, uranium, zironium, hafnium, titanium, boron, magnesium, chromium, manganese, vanadium, silicon, aluminum, beryllium, and mixtures and alloys thereof.

Another criterior for suitable light and heavy reactive metals is there be sufficient differences in the densities of the corresponding nitride products so that a molten solent of a single metal or an alloy of two or more metals can be found with a density intermediate between that of the light and heavy metal nitrides.

The molten metal solvent for metal oxide separation is essentially inert to the formation of a carbide or nitride under the conditions prevailing in the system as set forth in more detail below. In addition, such molten metal solvent is characterized by the requisite inermediate density and a solubility for the reactive metal. For very stable oxides, it is also desirable that the solvent metal have a tendency at lower temperatures to form stable intermetallic compounds with the reactive metals reduced from the oxide in solution so that the acitivity of the metal when in solution may be reduced to a relatively low level such that it does not react with the carbon to form carbides under the conditions employed for carrying out the process. This ability of a given solvent metal to form such intermetallic compounds at low temperatures appears to equate or correlate with the ability of the solvent metal to reduce the activity of the metal dissolved therein even at much lower temperatures. Depending upon the metal to be dissolved, a suitable molten metal solvent includes lead, zinc, bismuth, cadmium, silver, copper, iron, and tin as well as various alloys of these metals such as tin-lead, tin-bismuth, tin-lead-bismuth, tin-cadium and cadium-lead. Alloying may be particularly important to obtain a precise specific gravity between heavy and light metal nitride products of similar densities.

Detailed description of the method for determining the activity of the light or heavy free metal formed during the carbothermic portion of reaction (1) to avoid the formation of the corresponding metal carbide is set forth in detail in our aforementioned U.S. patent. As stated therein, the requirement for avoiding the formation of reactive metal carbide is essentially removed in the present process where the oxide is reduced to the free metal form and simultaneously contacted with a nitrogen-containing atmosphere for rapid conversion to the nitride. Since the nitride is more stable than the carbide in the temperature range of operation, the carbide formation is avoided. However, the use of a solvent of the foregoing type which is capable of forming stable intermetallic compounds with the reactive metal serves to lower the requisite amount of solvent.

In accordance with the present process, the light and heavy reactive metal oxides are fed to a molten metal solvent contained in a suitable reaction vessel together with at least a stoichiometric amount of a carbon source material. The carbon from the carbon source material preferably is added in moderate excess, e.g., 0.1 to 10% or more above this stoichiometric requirement. Suitable carbon source materials include particulate carbon black, lamp black, charcoal, coke, graphite, petroleum gases, wood products and the like.

To contain the various molten metal solutions employed in accordance with the present invention, an inert material, preferably graphite, is employed. Other inert, refractory materials may be employed such as boron nitride and beryllium nitride. For copper as a molten metal solvent, tungsten may be used for containment.

The reaction of the present invention is conducted at elevated temperatures, e.g., ranging from about 600° to 2300° K, a particular temperature chosen being at such a state as to maintain the metal solvent in the desired liquid state and to provide the desired concentration in the solution of the metal formed from the oxide during the reaction which can range upwardly from 1 to 50 to 60% or more. The temperature of the solution influences the activity of the reactive metal as well as its characteristics of forming nitrides and carbides in a manner that will be apparent to those skilled in the art. A preferred temperature range is about 100° K to 1800° K depending upon the solvent metal chosen. A preferred concentration of reactive metal in molten solvent may fall in a range from 3 to 50% depending upon the economics of the system. The lower limit of molten metal solvent is that which will form a liquid barrier to separate the light and heavy metal nitrides into distinct phases and which will be sufficient to lower the activity of the reactive metals to carry the reaction forward.

Heat is supplied to the unit as required by the use of conventional means such as electrical induction, electron beam heating or other heating methods.

In the step of reducing the reactive metal oxides to the corresponding metal in solution prior to the formation of the nitride, the CO partial pressure is maintained below the equilibrium value thereby promoting the reaction and causing it to go to completion. Since a source of nitrogen is required for the nitriding step, this is suitably accomplished by sweeping the gaseous head space above the reaction mixture with a gaseous nitrogen source material along or in combination with inert gas. This could be accomplished by recycling the nitrogen source and stripping the carbon monoxide formed during the reaction. Also, a partial vacuum may be drawn for this purpose. The carbon monoxide equilibrium value may be determined by the following relationship:

$$K = P_{CO}^2/P_{N_2}^{1/2} \qquad (2)$$

wherein $K$ can be calculated from known $\Delta G$ values such as available in the literature for this reaction. In most instances, the nitrogen partial pressure lies in a range of about 0.1 to 1.0 atmospheres to effect the desired nitride forming step. At these values, the carbon monoxide equilibrium pressures may be slightly greater or less than that which characterizes the reaction as conducted in the absence of nitrogen. Both reactions are temperature sensitive, (the CO partial pressure rising with temperature), and the CO partial pressure in the nitride reaction is slightly affected by the concentration of the reactive metal in the molten metal solvent.

The nitrogen-containing atmosphere over the reaction mixture has a nitrogen partial pressure sufficient for conversion of the reactive metal oxides to the corresponding nitride form. As used herein, the term "nitrogen-containing atmosphere" means a gaseous source of nitrogen for nitriding the metal. Suitable sources include nitrogen gas and ammonia gas. "Nitrogen partial pressure" quantities refer to either nitrogen gas or an equivalent amount of nitriding gas source, e.g., amonia gas. The nitrogen partial pressure may vary from 0.1 to 1 atmospheres or more depending upon the amount of nitrogen required for the reaction to proceed to completion at a desired rate.

The present process may be carried out in either batch form or continuously. In the latter case, the nitrides are continuously withdrawn from the system and the reactive metal oxide and carbon are continuously added to the same.

The present invention is particularly adapted for the separation of ores contaning zirconium oxide and hafnium oxide because of the difficulty in separating these metals by conventional chemical techniques and the substantial difference in the densiy of their corresponding nitrides (zirconium nitride - 7.0; hafnium nitride - 12.0). The overall specific reactions which occur for these metals are set forth below in equations (3) and (4) which follow the generalized reaction of equation (1) above:

$$ZrO_2(s) + 2C(s) + \tfrac{1}{2}N_2(g) = ZrN(s) + 2CO(g) \tag{3}$$

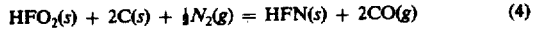
$$HFO_2(s) + 2C(s) + \tfrac{1}{2}N_2(g) = HFN(s) + 2CO(g) \tag{4}$$

For this system, the solvent metal is preferably one which renders the chemical activity of the zirconium and hafnium under the prevailing conditions of temperature and concentration which generally cooresponds to a solvent which forms stable intermetallic compounds with such metals. Also, the molten metal solvent should be inert to the carbon used for the carbothermic portion of the reaction and to the nitrogen-containing atmosphere employed to form the corresponding nitrides. Another characteristic of the solvent is that it has a density intermediate between the zirconium and hafnium nitrides. A particularly suitable solvent which satisfies all of the above criterion is copper having a density on the order of 8.9. Tin may also be employed if the temperature is low enough that is is in a density form on the order of 7.3. However, to avoid the problems of errors in operation which could cause the temperature to raise into an area where tin has a concentration less than that of zirconium, the tin may be alloyed with a second compatible metal such as nickel.

Another particularly suitable system for separation in accordance with the present invention is an ore of magnesium oxide and aluminum oxide because of the relatively large difference in densities between their corresponding nitrides (magnesium nitride - 2.70; aluminum nitride - 3.40).

It is apparent that if no single molten metal solvent possesses the desired density characteristics for the metal to be separated, an alloy of two or more metals of a precise desired density may be employed. In the case of two heavy metals, for example, a lead-tin alloy may be varied with precision between the density limits of 5 to 11 depending upon the proportions of the different alloying ingredients.

In the foregoing reaction, the coversion of the heavy and light reactive metal nitrides to metallic form may be accomplished by a number of different techniques. One common element in these techniques is that either the light or heavy reactive metal nitride or both are removed from contact with the molten metal solvent prior to such conversion. Otherwise, the advantage of separating the nitrides into different phases is lost.

For simplicity of description, the technique for converting the light and heavy reactive metal nitrides to separate metal form will be described with reference to zirconium nitride and hafnium nitride, respectively. It should be understood that these techniques also apply to the other light and heavy reactive metal nitrides. In a continuous process, the solid zirconium nitride floating on the molten metal solvent may be continuously withdrawn from the vessel as by skimming techniques and thereafter decomposed in accordance with the following equation:

$$ZrN \rightarrow Zr + \tfrac{1}{2}N_2 \tag{5}$$

This reaction requires extremely high temperatures when not in contact with molten metal solvent. Plasma heating techniques have been developed which can directly decompose the nitride to the metal without use of a metal solvent.

The separated zirconium nitride can also be converted to the metal by mixing the same with molten metal solvent either from a fresh solution or by skimming a sufficient quantity of solvent from the reaction vessel for this purpose. Any metal solvent may be employed in which the zirconium is soluble and which is readily separable, as by distillation. The decomposition reactions occurs primarily at the interface of the molten metal solvent and nitride. To increase the level of solubility at this point it is preferably that the solvent employed for this decomposition reaction be capable of forming stable intermetallic compounds with the zirconium.

In a similar manner, the hafnium nitride which has settled as a separate phase to the bottom of the nitriding vessel can be continuously withdrawn and decomposed by either of the foregoing techniques. Briefly summarized, where a molten metal solvent is employed, the solid hafnium nitride can be withdrawn as underflow along with a predetermined quantity of the molten metal solvent employed in the nitriding vessel. Alternatively, fresh molten metal solvent may be mixed with the hafnium nitride or in admixture with the withdrawn molten metal solvent.

In a batch reaction, either the zirconium or hafnium nitride can be removed from the reaction vessel. The remaining nitride can then be reduced in contact with the molten metal solvent employed for the nitriding reaction by reducing the partial pressure of nitrogen.

In the foregoing decomposition techniques which utilize a molten metal solvent, the separated zirconium and hafnium metals which are produced are each dissolved in a solvent. Accordingly, it is necessary to separate such metals from the solvent. Of course, the molten metal solvent in contact with the reactive metal nitride during reduction to metal should be selected to be readily separable from the reduced metal. A number of techniques for accomplishing the separation as set forth in our U.S. Pat. No. 3,794,482 incorporated at this point by reference. In general, such techniques are based upon the principle of phase separation. For example, if there is a substantial difference in the vaporizing temperatures between the metal solvent and the reactive metal, the metal with a lower melting point may be distilled as under vacuum to perform a separation of the two metals. Other conventional solid-liquid or liquid-liquid separation techniques may be employed to accomplish this separation.

II. Separation of Metals

The foregoing process relates to the separation of light and heavy reactive metals oxides by the carbothermic reduction to intermediate corresponding metals in a molten metal solvent and thereafter forming nitrides. However, the present invention also relates to the separation of difficult to separate metals which have previously been reduced. In this instance, the process comprises the second stage of the foregoing reaction, namely, the formation of the metals into nitride products of differing densities in a solvent of intermediate density. Thus, the foregoing description applies to this process with the exception of the features as set forth below.

In this embodiment, the method comprises the steps of dissolving a mixture of light and heavy metals reactive with nitrogen in a molten metal solvent which does not form a nitride under the conditions prevailing in the system. The light and heavy metals are converted into nitride products insoluble in the solvent by maintaining a nitrogen-containing atmosphere over the molten metal solvent having a nitrogen partial pressure sufficient for such conversion. In accordance with the foregoing principles, the molten metal solvent has a specific gravity intermediate between that of the light metal nitride and heavy metal nitride so that the light metal nitride floats in a separate phase in the upper portion of the solvent while the heavy metal nitride sinks in a separation in the lower portion of the same.

The concentrations of the light and heavy reactive metals in the molten metal solvent, the temperature and nitriding conditions and the techniques for decomposing and recovering the pure metal from the nitride after separation are generally the same as those set forth above.

That portion of the foregoing description relevant to reducing oxides to metal form has no application to this embodiment. Thus, there is no required carbon source material and no carbon monoxide is generated in the system. Suitable molten metal solvents for this purpose include lead, zinc, bismuth, cadmium, silver, tin, antimony, cobalt, indium, mercury, nickel, tellurium, thallium, and alloys and mixtures thereof.

Referring to the drawing, a schematic view of apparatus adapted to effect carbothermic reduction of a mixture of reactive metals and separation of the same via intermediate nitride formation is illustrated. In order to simplify the description, the light metal will be specified as zirconium, the heavy metal as hafnium, and the molten metal solvent as copper. A reactor vessel 10, suitably including a graphite lining, is illustrated with heat supply by induction coils 11. Reactor vessel 10 is isolated from the atmosphere by outer shell 12. The vessel initially contains copper in molten form. The metal oxide feed comprising hafnium oxide and zirconium oxide and the carbon source material are supplied to the reactor vessel through feed lines 13 and 14, respectively, from mixer station 16. Optionally, the carbon source may be added separately to the vessel.

A suitable gaseous source of nitrogen is supplied in recycle line 18 to the reactor vessel with make-up gas being fed through inlet line 19. If desired, the nitrogen gas on entering the melt may be admixed with an inert gas such as argon, helium or the like. Unreacted nitrogen gas along with carbon monoxide formed during the reduction reaction and inert gas employed are withdrawn from outer shell 12 through recycling line 18. Carbon monoxide removed from the reactor in recycle line 18 is removed from the system by separator 17. The energy content of the carbon monoxide separated at this point may be recovered by burning.

The above process is carried out with the stoichiometric excess of carbon to convert the zirconium oxide and hafnium oxide to metal form in the copper solvent. The zirconium and hafnium metal, which readily react with nitrogen, are rapidly converted to the corresponding insoluble nitrides of densities such that the insoluble zirconium nitride floats in a separate phase above or in the upper portion of the molten copper while the insoluble hafnium nitride sinks as a separate phase below or in the lower portion of the solvent.

In the embodiment of the drawing, the system is operated continuously with the withdrawal of the hafnium nitride as underflow from the system in line 20. The hafnium nitride may be treated as by leaching with an acid cleaning step or by high temperature distillation step to remove any residual entrained copper, if so desired, at this point. Then, the metal is directed via line 20 to a decomposition vessel 21 which has been supplied with a suitable molten metal solvent, e.g., copper. The hafnium nitride is decomposed to hafnium metal by lowering the nitrogen pressure over the solvent in vessel 21 as by drawing a vacuum. The hafnium metal forms an alloy with the copper solvent. After completion of this reaction as evidenced by complete dissolution of the nitride, the hafnium-copper alloy is directed to a distillation column 22 wherein the copper metal is distilled off for reuse as a solvent in vessel 21. After distillation of copper is complete, the hafnium vessel is removed as pure metal.

In a similar manner, the floating phase of zirconium nitride is removed from vessel 10 as by skimming through line 23 and directed to a decomposition vessel 24 supplied with a suitable molten metal solvent. As with the hafnium, the nitrogen pressure is reduced in vessel 24 by application of a vacuum and the zirconium nitride is decomposed to zirconium metal which forms an alloy which is directed to distillation column 25. The molten metal solvent is distilled from the distillation column 25 and recycled to decomposition vessel 24. The zirconium metal is then recovered in pure form below the distillation column. If the metal solvent selected for distillation columns 22 or 25 has a higher boiling point than the hafnium or zirconium, respectively, the metal recovered is the distillate and the recycled metal solvent is recovered from below the column.

In order to more clearly disclose the nature of the present invention, a specific example of the practice of the same is given herein. It is to be understood, however, that this is done by way of example and is intended neither to delineate the scope of the invention nor limit that of the appended claims.

EXAMPLE

One gram of zirconium, one gram of hafnium and twelve grams of copper are mixed and heated to 1500° K to form a liquid alloy. This alloy is subjected to nitriding at one atmosphere for a period of 1 hour and then cooled to form an ingot. Upon splitting, the following three distinct layers were observed from top to bottom:

1. zirconium nitride free of hafnium,
2. copper metal free of zirconium or hafnium, and
3. hafnium nitride free of zirconium.

We claim:

1. In a method for the separation of a light metal reactive with nitrogen and a heavy metal reactive with nitrogen from a mixture containing the same metals, the steps of dissolving said mixture in a molten metal solvent which does not form a nitride under the conditions prevailing in the system, converting the light and heavy metals into nitride products insoluble in said solvent by maintaining a nitrogen-containing atmosphere over the molten metal solvent having a nitrogen partial pressure sufficient for said conversion, said molten solvent having a specific gravity sufficiently greater than said light metal nitride so that said last named nitride floats in a separate phase in the upper portion of said solvent, said metal solvent having a specific gravity sufficiently less than said heavy metal nitride so that said last named nitride sinks in a separate phase in the lower portion of said solvent, said metal solvent being present in sufficient quantity to form a liquid barrier separating said light and heavy metal nitrides into distinct phases.

2. A method as in claim 1 in which said light and heavy reactive metals are selected from the group consisting of niobium, tantalum, plutonium, uranium, zirconium, hafnium, titanium, boron, magnesium, chromium, manganese, vanadium, silicon, aluminum, beryllium, and mixtures and alloys thereof.

3. A method as in claim 1 in which said molten metal solvent is selected from the group consisting of lead, zinc, bismuth, cadmium, silver, tin, antimony, cobalt, indium, mercury, nickel, tellurium, thallium, and alloys and mixtures thereof.

4. A method as in claim 1 in which said light reactive metal is zironium and said heavy reactive metal is hafnium.

5. A method as in claim 4 in which said molten metal solvent is selected from the group consisting of copper, tin and alloys thereof.

6. A method as in claim 1 in which said light reactive metal is magnesium and said heavy reactive metal is aluminum.

7. A method for the separation of a light metal reactive with nitrogen and a heavy metal reactive with nitrogen wherein said metals are in oxide form, which comprises the steps of reducing said oxides by reacting the same with at least a stoichiometric amount of a carbon source material in a molten metal solvent which does not form a carbide or nitride under the conditions prevailing in the system, converting the reduced reactive metals into nitride products insoluble in said molten metal solvent by maintaining a nitrogen-containing atmosphere over said solvent having a nitrogen partial pressure sufficient for said conversion, said metal solvent having a specific gravity sufficiently greater than said light metal nitride so that said last named nitride floats in a separate phase in the upper portion of said solvent, said metal solvent having a specific gravity sufficiently less than said heavy metal nitride so that said last named nitride sinks in a separate phase in the lower portion of said metal solvent, said metal solvent being present in sufficient quantity to form a liquid barrier separating said light and heavy metal nitrides into distinct phases.

8. A method as in claim 7 in which the molten metal solvent is selected from the group consisting of lead, zinc, bismuth, cadmium, silver, tin, copper, iron and mixtures and alloys thereof.

9. A method as in claim 7 in which said light and heavy reactive metals are selected from the group consisting of niobium, tantalum, plutonium, uranium, zirconium, hafnium, titanium, boron, magnesium, chromium, manganese, vanadium, silicon, aluminum, beryllium, and mixtures and alloys thereof.

10. A method as in claim 7 in which said light reactive metal is zirconium and said heavy reactive metal is hafnium.

11. A method as in claim 10 in which said molten metal solvent is selected from the group consisting of copper, tin, and alloys thereof.

12. A method as in claim 7 in which said molten metal solvent is capable of forming stable intermetallic compounds with the light and heavy reactive metals.

13. A method as in claim 7 in which said heavy reactive metal nitride is removed from contact with the molten metal solvent and decomposed to metal form.

14. A method as in claim 13 in which the nitrogen partial pressure over said residual light reactive metal nitride and molten metal solvent mixture is reduced to a sufficient extent to reduce said nitride to metal.

15. A method as in claim 7 in which said light reactive metal nitride is removed from contact with the molten metal solvent and decomposed to metal form.

16. A method as in claim 15 in which the nitrogen partial pressure over said residual heavy reactive metal nitride and molten metal solvent mixture is reduced to a sufficient extent to reduce said nitride to metal.

* * * * *